May 3, 1949.  K. G. R. HAWKINS  2,468,874
TORSION DRIVEN TOOL
Filed Nov. 7, 1946
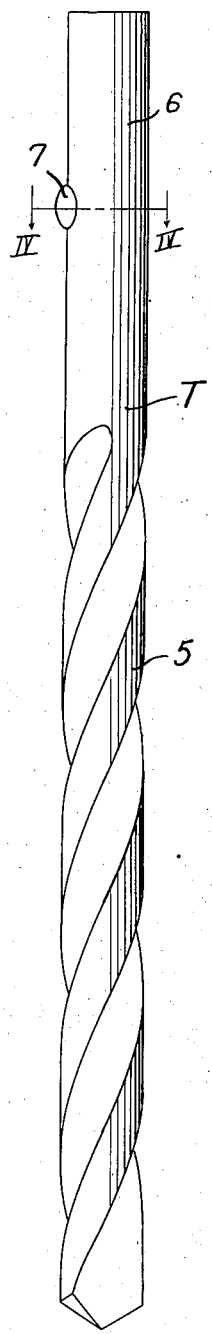
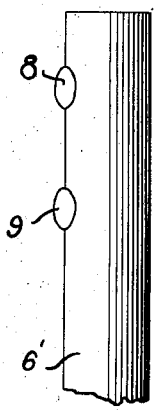
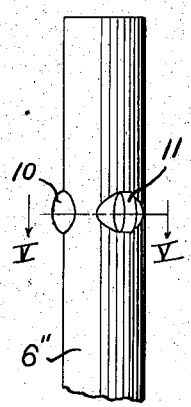
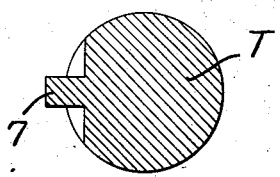
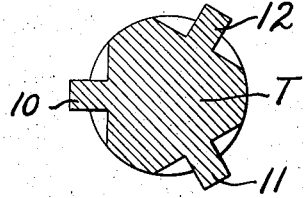
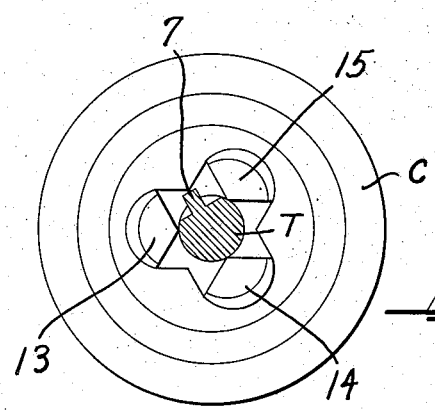
Inventor
KARL G. R. HAWKINS.
by The Firm of Charles W. Hills Attys.

Patented May 3, 1949

2,468,874

UNITED STATES PATENT OFFICE 2,468,874

TORSION DRIVEN TOOL

Karl G. R. Hawkins, Park Ridge, Ill.

Application November 7, 1946, Serial No. 708,322

1 Claim. (Cl. 77—71)

The present invention relates to torsion driven tools, such for example as drills, reamers, taps, counterbores and the like, which are operated by application of torsion driving force applied to them.

Standard drills, reamers, taps, counterbores and similar torsion tools are in the main manufactured with smooth cylindrical shanks. The shanks of the tools are inserted in chucks for use, usually in chucks having three jaws. The chuck jaws have sharp edges which bite into the tool shanks to center and drive the tools. Ultimately said shanks become scarred from the jaw edges, thus interfering with the precision alignment of the tools in the chucks.

According to the present invention, this difficulty is obviated by forming the shanks with parts thereof out of the cylindrical surface thereof, constituting abutment means adapted for physical contact engagement with a part of a tool holder, such as a chuck or collet, for effecting positive driving relations between the tools and the holders.

It is therefore an object of the present invention to provide a torsion tool shank with protuberant means engageable in positive driving relation with a tool holder, such as a chuck, without scarring or defacing the surface of the shank, at the same time assuring positive driving relation between the tool and its holder.

A further object of the present invention is to provide means for connecting a torsion tool in a chuck, to secure positive driving relation between the tool and the chuck without damaging the tool shank.

The invention has for a further object, the provision of a torsion tool having its shank formed with a part thereof out of the cylindrical surface thereof and constituting abutment means adapted for physical contact engagement in circumferential direction by part of a tool holder to effect positive driving relationship of the tool and its holder.

The above, other and further objects of the present invention will be apparent from the following description and the accompanying drawing.

On the drawing:

The form of tool chosen to exemplify the present invention takes the form of a twist drill, and is illustrated in the accompanying drawing, and the views thereof are as follows:

Figure 1 is an elevational view of a torsion tool, such as a twist drill, having its shank formed with a protuberant part;

Figure 2 is a fragmental elevational view of a shank of a torsion tool showing two protuberant parts arranged in tandem in the tool shank;

Figure 3 is a fragmental elevational view of another shank showing a plurality of protuberant parts spaced circumferentially of the shank;

Figure 4 is a transverse sectional view taken in the plane of line IV—IV of Figure 1;

Figure 5 is a transverse sectional view taken in the plane of line V—V of Figure 3; and Figure 6 is an end view of a chuck of conventional form illustrating in section a tool of the present invention, as the same appears when secured by jaws of the chuck.

A torsion tool T is shown in elevation in Figure 1 and appears as a twist drill having a screw flight 5 and a cylindrical shank 6.

In the manufacture of such tools the shank portions are relatively softer than the grooved flights or other cutting portions.

Formed in the shank 6 is a lug or protuberant portion 7 formed preferably by swaging.

Figure 2 illustrates a shank having two such lugs or protuberant portions 8 and 9 arranged in tandem, that is, lengthwise of the shank.

Figure 3 illustrates the protuberant parts or lugs 10, 11 and 12 arranged circumferentially about the shank of the tool.

I have found that the lugs or protuberant portions of the shank of the present invention are very readily formed by swaging, or, of course, they could be formed by other means well known to toolmakers.

According to Figure 6, a conventional three-jaw chuck is indicated at C with jaws 13, 14 and 15 shown as engaging the shank portion of a tool T in holding relation.

Figure 6 shows a tool of the form of Figure 1, hence the tool T would have but one lug or protuberant portion 7 which, when the tool is applied to a holder, such as a chuck C, enters between the side margins of two adjacent jaws of a chuck such as jaws 13 and 15. Thus, as the chuck jaws are tightened against the shank of the tool, it is necessary to tighten the jaws only sufficiently to prevent the tools from being displaced from the chuck while in use. Should the torsional strain imposed on the tool by the work, be such as to cause the tool to turn in the chuck, then the tool would turn from the position shown in Figure 6 until the lug or protuberant portion 7 engaged a lateral surface of one of the jaws 13 or 15, depending on the direction of the rotation of the tool.

It is to be understood that when a tool embodying the present invention is inserted in a holder, the lug means may be disposed against some lateral portion of the holder so as to eliminate any relative rotative movement between the tool and its holder when in use.

In the event that a tool having the shank such as that shown in Figure 2 is inserted in a chuck such as shown in Figure 6 one of the lugs 8 and 9 would then occupy the space between two of the adjacent jaws of the chuck.

When a shank of the character illustrated in Figure 3 is inserted in such a chuck, then the lugs or protuberant parts 10, 11 and 12 will be disposed in the spaces between the jaws of the chuck, with one lug or part per space, as may be readily understood.

There are some machines using torsion tools which employ collets to hold such tools in the driving members of the machine.

Usually a collet has an axially extending slot or split in its cylindrical surface, whereby the collet may be tightened about a tool. Tools of the forms shown in Figures 1 and 2 could readily be applied to collets, with the lugs entered in the splits. If a tool of the form shown in Figures 3 and 5 were to be used with a collet, then it would be necessary to mill grooves in the inner surface of the collet to receive two of the three lugs, one lug being entered in the split of the collet.

The chuck shown in Figure 6 operates in a manner well understood.

In applying a tool of the present invention to said chuck, the chuck is opened to spread the jaws to receive the shank of the tool. If the shank is of the form shown in Figure 1, then it is inserted in the chuck with the lug 7 between two adjacent jaws of the chuck, whereupon the chuck is tightened to hold the tool in place.

When a tool having a shank such as that shown in Figure 2 is inserted in the chuck of Figure 6, then after the jaws are loosened the shank is inserted with one of the lugs 8 and 9 lying between two adjacent jaws of the chuck, unless the chuck jaws are long, whereupon both lugs would lie between two adjacent jaws.

A tool having a shank such as that illustrated in Figure 3 is inserted in a chuck, such as that shown in Figure 6, by loosening the jaws, and inserting the shank with a lug between two adjacent jaws, there being three lugs occupying the spaces between the three jaws.

Thus when the chuck is tightened the tool is secured in positive driving relationship with the chuck.

The shank construction of the present invention may be used on drills, reamers, taps, counterbores, countersinks, or on any other torsion tool which is driven by a chuck or other suitable tool holder. The gist of the present invention resides in the fact that the tool shanks are provided with protuberant means forming abutments engageable in physical contact operating in circumferential direction, with a part of a tool holder for effecting positive driving engagement of the tool with its holder.

A torsion tool having the shank construction of the present invention enjoys longer life in use, than tools without such improvement, as there is less strain on the chuck and the shanks of the tools are not unduly scored. There is, therefore, no uneven strain or wear on the jaws of the chuck, thereby prolonging the life of the chuck and enabling longer use of a tool, because of the fact that the shank of the tool is not scored to any appreciable extent, by the jaws of a tool holder or chuck.

It will, of course, be understood that various details of construction may be varied through a wide range without departing from the principles of this invention, and it is, therefore not the purpose to limit the patent granted hereon otherwise than necessitated by the scope of the appended claim.

The invention is claimed as follows:

A torsion tool comprising a body having a cutting portion and a cylindrical shank adapted to be engaged by a standard rotary 3-jaw chuck, the major area of said shank presenting an unbroken cylindrical surface for engagement by the chuck jaws, and a small torsion key lug swaged up from said cylindrical surface and projecting from said surface intermediate the ends thereof, said lug being substantially shorter than said cylindrical surface and of a width and extent less than the spacing between adjacent jaws of the chuck when tightened against the cylindrical surface so that the lug can be received freely in such space to limit torsional slippage of the chuck jaws.

KARL G. R. HAWKINS.

REFERENCES CITED

The following references are of record in the file of this patent:

UNITED STATES PATENTS

| Number | Name | Date |
|---|---|---|
| 369,248 | Johnson | Aug. 30, 1887 |